United States Patent
Piguet et al.

[11] Patent Number: 5,845,311
[45] Date of Patent: Dec. 1, 1998

[54] HIERARCHICAL ROMS THAT ARE SELECTIVELY ACCESSED BY MICROPROCESSOR INSTRUCTIONS CONTAINING CODES

[75] Inventors: Christian Piguet, Neuchatel; Jean-Marc Masgonty, Corcelles, both of Switzerland

[73] Assignee: CSEM Centre Suisse d'Electronique et de Microtechnique, Neuchatel, Switzerland

[21] Appl. No.: 621,059

[22] Filed: Mar. 22, 1996

[30] Foreign Application Priority Data

Mar. 23, 1995 [FR] France ................................ 95 03432

[51] Int. Cl.[6] ............................................. G06F 12/00
[52] U.S. Cl. .......................... 711/102; 711/117; 711/122; 711/170
[58] Field of Search .................... 395/497.03, 497.02, 395/444, 449, 403; 364/DIG. 1, 243.4, 243.41; 711/170, 171, 172, 117, 122, 3, 102

[56] References Cited

U.S. PATENT DOCUMENTS

| | | |
|---|---|---|
| 4,435,775 | 3/1984 | Brantingham et al. |
| 4,958,304 | 9/1990 | Moore ..................................... 395/449 |
| 5,073,851 | 12/1991 | Masterson et al. ...................... 395/467 |
| 5,109,498 | 4/1992 | Kamiya et al. ..................... 395/497.03 |
| 5,155,828 | 10/1992 | La Fetra et al. .......................... 395/449 |
| 5,175,834 | 12/1992 | Sawai .................................. 395/497.03 |
| 5,175,836 | 12/1992 | Morgan ............................... 395/497.03 |
| 5,241,663 | 8/1993 | Rohwer ................................... 395/449 |
| 5,249,282 | 9/1993 | Segers et al. ............................ 395/449 |
| 5,307,477 | 4/1994 | Taylor et al. ............................ 395/449 |
| 5,471,598 | 11/1995 | Quattromani et al. ................... 395/449 |
| 5,539,893 | 7/1996 | Thompson et al. ...................... 395/449 |
| 5,568,635 | 10/1996 | Yamaguchi ......................... 395/497.02 |
| 5,581,725 | 12/1996 | Nakayama .............................. 395/449 |
| 5,606,688 | 2/1997 | McNutt et al. .................... 395/497.01 |

FOREIGN PATENT DOCUMENTS

| | | |
|---|---|---|
| 0 082 903 | 7/1983 | European Pat. Off. . |
| 63-201828 | 8/1988 | Japan . |

*Primary Examiner*—Tod R. Swann
*Assistant Examiner*—Tuan V. Thai
*Attorney, Agent, or Firm*—Pollock, Vande Sande & Priddy

[57] ABSTRACT

The invention relates to computer systems containing at least one microprocessor associated with at least one memory in which are recorded instructions of a program and/or data to be processed according to the instructions.

The memory is divided up into N≧2 modules, one of which has a greater capacity than the other and the access time of which increases in proportion to its capacity. The module of smallest capacity is reserved for the instructions and/or data of the programs which are the most often used and the module of larger capacity is reserved for the instructions and/or data of the programs which are the least often used. The instruction contains a code identifying the module to be used.

12 Claims, 3 Drawing Sheets

HIERARCHICAL ROMS THAT ARE SELECTIVELY ACCESSED BY MICROPROCESSOR INSTRUCTIONS CONTAINING CODES

FIELD OF THE INVENTION

The invention relates to computer systems comprising at least one microprocessor associated with at least one memory in which are recorded instructions of a program and/or data to be processed which are read by the microprocessor in order to be used by the latter in accordance with the instructions of the program.

BACKGROUND OF THE INVENTION

Since programs of instructions are continually growing in size and the volume of data to be processed by the same program also continues to grow, designers of computer systems have been led to use increasingly large memories. Now, memories of large size or capacity have longer access times than those of memories of smaller capacity whilst, furthermore, microprocessors have shorter and shorter calculating times as the development of manufacturing technologies progresses.

In order to respond to this inadequacy, various solutions have been proposed and one of these consists in using, in addition to the main memory, small fast memories called cache memories for recording instructions and/or data as well as the address codes of these instructions and/or data in the main memory. When the microprocessor sends a main memory selection address, the latter is compared with the addresses contained in the cache memory and, if the comparison is positive, the instruction and/or the corresponding data is read from this cache memory in order to be transmitted to the microprocessor so that it can be processed. If the comparison is negative, the microprocessor must stop to access the main memory in a certain number of cycles and fetch the information sought by the microprocessor. This information is recorded in the cache memory with its corresponding address and the microprocessor can resume its task and read the sought information from the cache memory. Thus, during a subsequent operation of the microprocessor, if the same address code is transmitted by the microprocessor, the corresponding information will be read from the cache memory.

The basic principle upon which the use of a cache memory depends is modelling of the future on the past by assuming that the instructions or data which have been used in the past will be those which will be the most often used in the future. Experience shows that this prediction proves to be correct with a very high probability.

All modern microprocessors comprise cache memories. The structures of these cache memories, called associative because they record not only the instructions and/or the data but also the address codes of the main memory, are relatively complex to design. Furthermore, in order to obtain a high usage rate, they must be big and, in current computer systems, can reach a capacity of 16,000 bytes, which corresponds to a chip containing more than a million transistors. Such a chip is of relatively high cost, consumes energy in order to operate continuously and has an access time which increases in proportion to its storage capacity.

One purpose of the present invention is therefore to design a computer system comprising a microprocessor associated with a main memory of large capacity in which the number of accesses to this main memory is decreased so that this results in an increase in the speed of the computer system and a reduction in its energy consumption.

BRIEF DESCRIPTION OF THE INVENTION

The invention relates to a computer system comprising a microprocessor associated with a memory, wherein the said memory is divided up into N modules where N is equal to or greater than 2, of increasing capacity, the access time to each memory module increasing as a function of its capacity, the smallest capacity module being reserved for the instructions or data of the programs which are most often used during the operation of the computer system and the largest capacity module being reserved for the instructions or data of the programs which are the least often used during the functioning of the computer system and wherein each instruction for access to said memory contains a code identifying the memory module from which the instruction and/or data must be read.

The invention also relates to a method of implementing a computer system containing a microprocessor associated with a memory, comprising the following steps of:

determining the frequency of use by the microprocessor of the programs of instructions or of data, recording programs of instructions or of data the frequency of use of which is higher than a threshold S1 in a first memory module having a short access time, recording programs of instructions or of data the frequency of use of which is lower than said threshold S1 in at least one other memory module having a longer access time, allocating, to each read address of the memory modules, a code identifying the memory module which must be read at the indicated address, transmitting by the microprocessor to each memory module of the read address and of the code identifying the memory module to be read, and transmitting to the microprocessor of the instruction or data read from the memory module identified by said code.

Other objects and features of the present invention will appear on reading the following description of particular embodiments, said description being given with reference to the accompanying drawings in which:

DETAILED DESCRIPTION OF THE INVENTION

Figure 1:
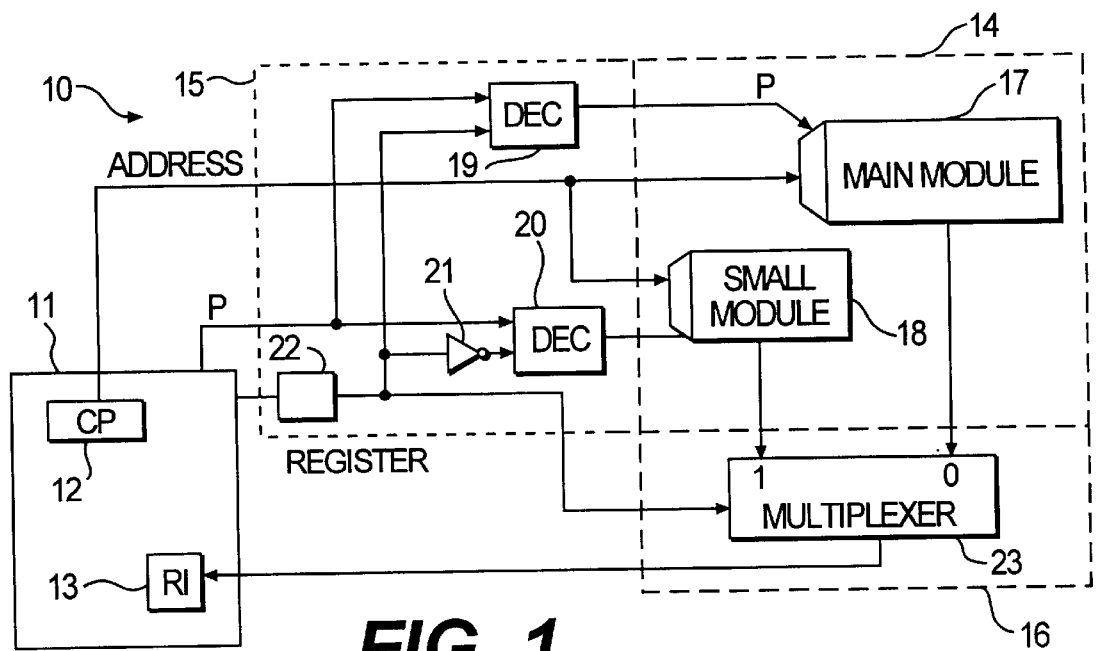
FIG. 1 is a block diagram of a computer system according to the invention with a memory containing program instructions.

The invention will be described in its application to the reading, by a microprocessor, of a memory containing program instructions of the read only type, better known by its English acronym ROM (standing for Read Only Memory) but it also applies to the reading, by a microprocessor, of a memory containing data which is, in general, of the random access type, better known by its English acronym RAM (standing for Random Access Memory).

The computer system 10 according to the invention comprises a microprocessor 11 which has access to an instruction memory 14 of the ROM type via an input circuit 15. The instructions read from the memory 14 are transmitted to the microprocessor 11 via an output circuit 16.

The microprocessor 11 schematically comprises a program counter 12 (CP) and an instruction register 13 (RI). The memory 14 comprises, according to the invention, at least two memory modules 17 and 18 the capacities of which are very different: a first module 18 of small capacity or "small" module in which are recorded the instructions of the most often used programs and a second module 17 or "main" module in which are recorded the instructions of the other programs will are, in fact, the least often used. The input circuit 15 comprises a register 22 for recording a one-bit code which is supplied by the microprocessor 11 and which indicates the identity of the module 17 or 18 which will be read. The output terminal of this register 22 is connected to one of the two input terminals of two decoding circuits 19 and 20 (DEC), the other input terminal of the decoding circuits being connected to an output terminal of the microprocessor, the one supplying a signal called the precharge signal P of the memory modules. The connection of the register 22 to the decoding circuit 19 is direct whilst that of the decoding circuit 20 is by the intermediary of an inverter circuit 21. These circuits 19, 20, 21 and the register 22 perform the "precharging" of the memory modules 17 and 18 in order to prepare for the reading of the memory cells identified by an address code provided by the program counter 12 of the microprocessor 11. Depending on the value of the bit 0 or 1 contained in the register 22, only one of the memory modules 17 or 18 will be read. Thus, according to the conventions of FIG. 1, when the bit is 0, the memory module 17 is read whilst when the bit is 1, only the memory module 18 is read.

The output circuit 16 of the memory modules 17 and 18 mainly comprises a multiplexer circuit 23 which is controlled by the bit set in the register 22 according to the same conventions as for access to the memory module. The multiplexer circuit 23 has its output terminals which are connected to the input terminals of the instruction register 13.

In order for the computer system which has just been described with reference to FIG. 1 to operate, indications must be provided in the instructions, and these indications have to be inserted by the programmer. Thus, in the case of two memory modules 17 and 18 of the system shown in FIG. 1, the programmer inserts a pair of special instructions, one of them, EMM, for activating the memory module 17, called the main module, and the other one, DMM, for deactivating the memory module 17. Thus, according to the conventions mentioned above, EMM will correspond to the bit 0 and DMM will correspond to the bit 1. These special instructions are generated by the microprocessor 11, which means that it will then consider the register 22 as a peripheral register.

To determine the content of the memory 18, the programmer must select the programs which are the most often used, which makes it possible to determine the portions of the address codes corresponding to the series of instructions of these programs. It is these portions of the address codes which will be used for selecting the cells of the memory module 18 for recording the instructions of the much used programmes and for their subsequent reading during the execution of the programs. The use of a program simulator is recommended for this selection of the most used programs.

By way of example, in a computer system for an electronic watch, the time calculating program is used every second whereas the calendar calculating program is used once a day, the month calculating program is used once a month and the year calculating program is used once a year. Likewise, the crown and mode calculating program is activated only a few times per day at the most.

Figure 2:
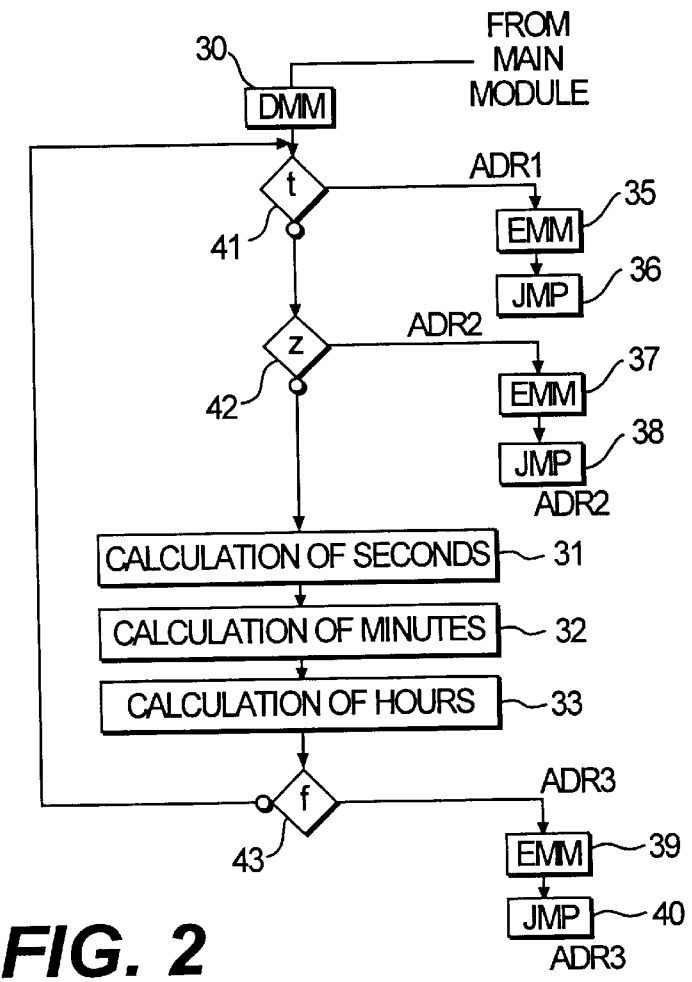
FIG. 2 is a diagram of program instructions which are, for example, recorded in a memory module according to the invention.

FIG. 2 is a diagram of the instructions of the various programs which are recorded in the memory module 18 for an electronic watch implementing the system according to the invention and according to the criteria defined in the preceding paragraph.

In this diagram, the rectangular boxes 30 to 33 and 35 to 40 indicate either a special instruction such as EMM or DMM or a series of instructions for calculating the seconds, calculating the minutes and calculating the hours. The diamond-shaped boxes, 41, 42 and 43, containing the letters t, z and f respectively, indicate the unconditional jumps to the memory module 17 for the execution of the least used programs such as the calculation of months and years (jump f), mode management (jump t) or alarm management (jump z). In order to make these jumps, the index of instructions contains operating codes which are different depending on the jumps and which indicate the memory module in which the series of instructions is found and the address ADR1, ADR2 or ADR3 in the module.

Furthermore, each instruction can comprise an additional bit, in the case of two memory modules, to indicate which memory module contains the next instruction.

Figure 3A:
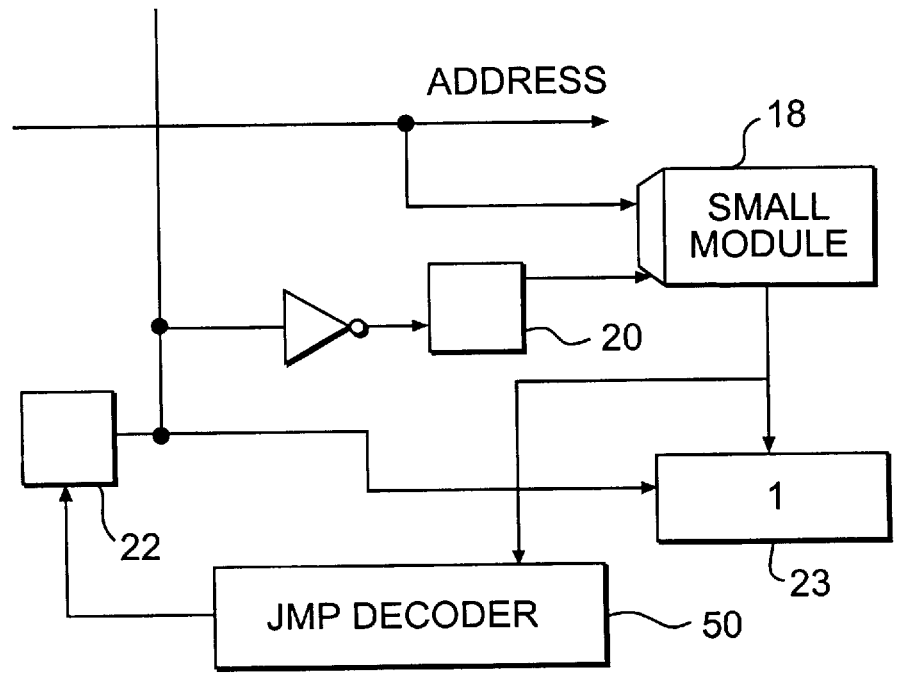
FIGS. 3A and 3B are variants of the block diagram of FIG. 1 for access to a memory module according to the invention in the case of an unconditional jump.
Figure 3B:
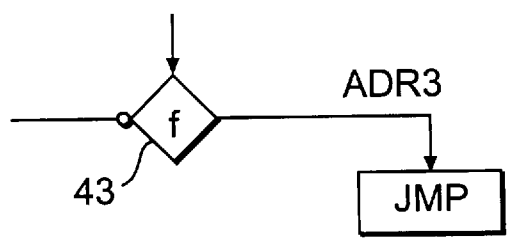

In FIG. 3A, the branch or jump operating code JMP is decoded by a decoder circuit 50 the output signal of which resets the register 22, which indicates that the next address is to be sought in the main module and activates the latter; the instruction EMM of FIG. 2 is therefore no longer necessary and the sequence moves directly on to address ADR1, ADR2 or ADR3 (FIG. 3B).

The computer system according to the invention which has been described with reference to FIGS. 1, 2 and 3 comprise only two memory modules 17 and 18 but it is clear that the invention applies to N memory modules M1, M2, . . . , MN of progressively increasing capacity and of progressively increasing access time. It is therefore necessary to provide N EMM instructions, EN1 to ENN and N DMM instructions, DM1 to DMN. The same applies to the operating codes for the unconditional jumps which must specify the identity of the memory module in which the series of instructions is located, that is to say N different operating codes. Finally, in order to indicate in each instruction the identity of the memory module in which the next instruction is found, the latter must contain n additional bits such that $2_n \geq N$.

As mentioned above, the memories have access times which become longer as their capacity becomes greater. Furthermore, large capacity memories with long access times have relatively low cost prices so that it is advantageous to use them for instructions or data which are addressed infrequently. On the contrary, for instructions or data which are addressed frequently, it is preferable to record them in memories having short access times which can be obtained with memories of small capacity the cost price of which is relatively low.

Figure 4:
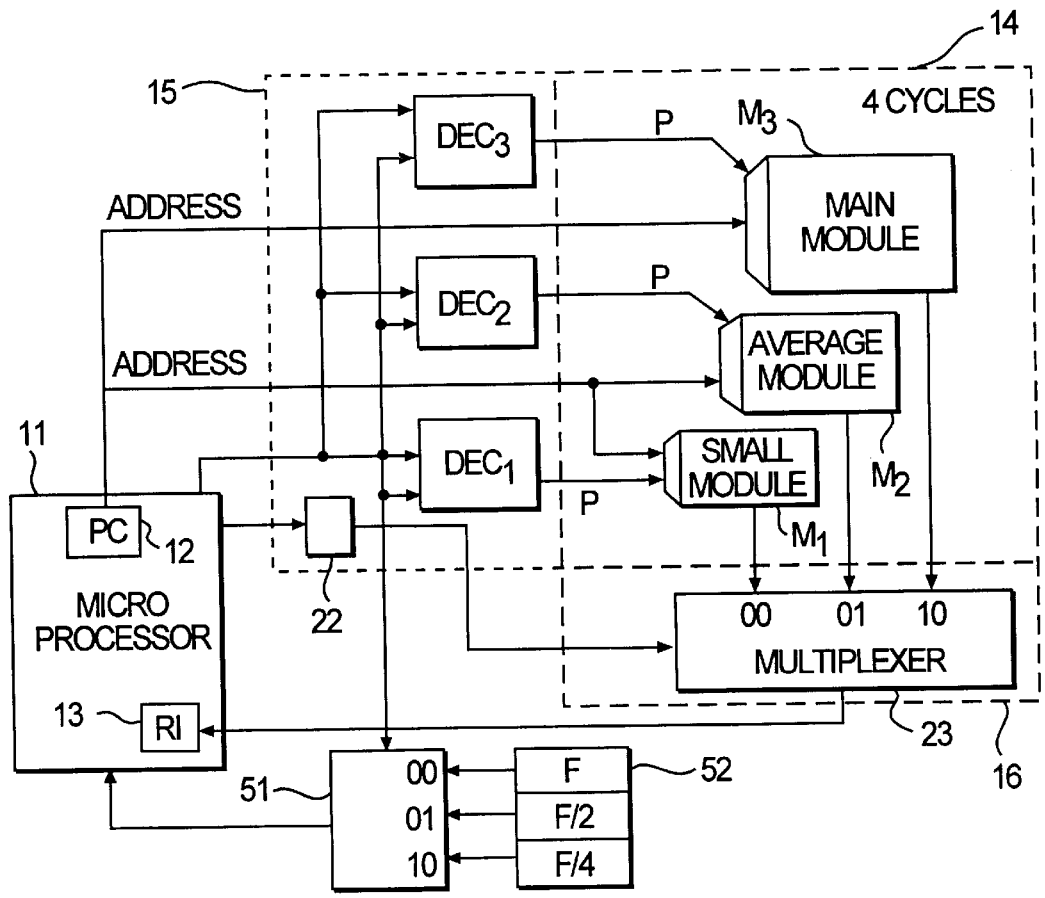
FIG. 4 is a block diagram, similar to that of FIG. 1, of a computer system according to the invention in which the different memory modules have different access times.

Hence, according to the invention, it is proposed to use memory modules which have systematically different access times and capacities. FIG. 4 is therefore a block diagram of a computer system according to a variant of the invention, whose memory 14 is divided up into N=3 memory modules M1, M2 and M3 having access times which are one cycle, two cycles and four cycles respectively. In this variant, the register 22 has two bits and the codes which it records as a peripheral component of the microprocessor 11 are decoded by the decoding circuits DEC1, DEC2 and DEC3 in such a way as to select only one of the memory modules M1, M2 or M3 and to instruct the multiplexer 23 of the output circuit 16 to switch the information (instructions or data) to the microprocessor 11.

In order to obtain different access times, provision is made to modify the frequency of the clock signals which are applied to the microprocessor 11. This is achieved by means of a multiplexer circuit 51 which is controlled by the codes contained in the register 22 in such a way as to switch the signals of different frequencies F, F/2 and F/4 supplied by a clock circuit 52 to the microprocessor 11 according to the value of the codes such as code 00 for the frequency F and the memory module M1, code 01 for the frequency F/2 and the memory module M2 and code 10 for the frequency F and the memory module M3.

By way of illustration, if the memory module M1 contains the programmes which are used 60% of the time, the module M2 contains the programs which are used 30% of the time and the memory module M3 contains the programs which are used 10% of the time, the mean cycle time is 1.6 cycles per instruction. The result of this is that in 6 cycles out of 16, the microprocessor would have to execute a non-operative cycle with the memory module M2 and three non-operative cycles with the memory module M3, which reduces the efficiency of the microprocessor 11.

In order to improve this efficiency of the microprocessor 11 which can execute one instruction per cycle at the frequency F, the invention proposes reading the memory modules M1, M2 and M3 in parallel, that is to say reading, per cycle of frequency F, one instruction from the memory module M1, two instructions from the memory module M2 and four instructions from the memory module M3. In this case, the parallel instructions, provided that they contain no jumps, can be transmitted to the microprocessor one after the other at the frequency F with the execution of one instruction per cycle.

Figure 5:
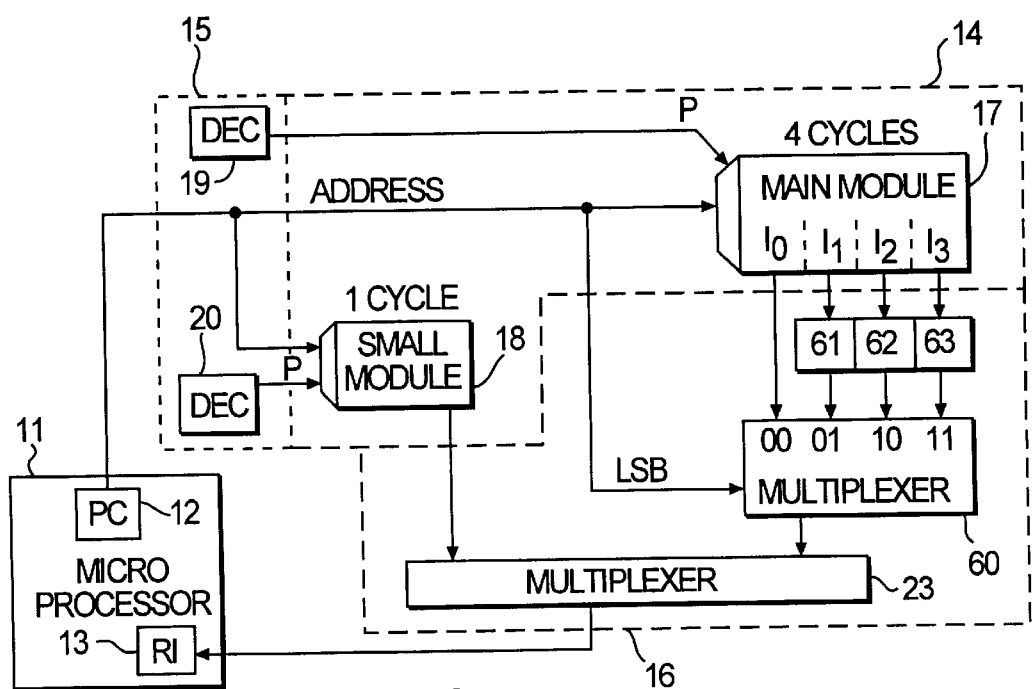
FIG. 5 is a block diagram, similar to that of FIG. 1, of a computer system according to the invention in which reading of several instructions in parallel is provided.

The block diagram shown in FIG. 5 is similar to that of FIG. 1 in the sense that the memory 14 is divided up into two memory modules 17 and 18 but it differs from it in that the input circuit 15 and the output circuit 16 are provided for reading, in parallel and per cycle of frequency F, one instruction from the memory module 18 and four instructions from the memory module 17 and for switching these instructions to the microprocessor 11. Furthermore, the memory module 17 has an access time of four cycles of frequency F.

For this purpose, the output circuit 16 contains, not only the multiplexer circuit 23, but also an additional multiplexer circuit 60 at the output of the memory module 17 which is controlled by the decoding of the two least significant bits (LSB) of the address code. Between the memory module 17 and the multiplexer circuit 60 there are provided three buffer memories 61, 62 and 63 for recording the three of the four instructions I0, I1, I2 and I3 which are read in parallel, those which are not executed immediately, namely I1, I2 and I3, the first one I0 being transmitted immediately to the multiplexer circuit 60.

The operation of the computer system shown in FIG. 5 is therefore as follows. When the memory module 18 supplies an instruction which controls the reading of instructions from the memory module 17 the access time of which is four times longer than that of the memory module 18, the microprocessor 11 must execute three non-operative cycles (NOP) before being able to load one of the four instructions, in principle the instruction I0, into the register 13. The other three instructions I1, I2 and I3 are stored in the buffer memories 61, 62 and 63 respectively and the invention provides for precharging the memory module 17 for the purpose of a readout in a single cycle when the instructions I1, I2 and I3 have been transmitted one after the other at each cycle of the microprocessor by the multiplexer circuit 60 under the control of the signal of the LSB code. Thus, while executing the instruction I3, the memory module 17 is read at the indicated address and four new instructions are available for the next cycle so that the new first instruction I0 is transmitted to the microprocessor 11. There are not therefore three non-operative cycles for the second set of four instructions and the following ones.

In the case of a jump instruction, a portion of the instructions read are not useful and it is therefore necessary to insert non-operative cycles or to use other solutions which are not described here.

In order to avoid three non-operative cycles for the first readout of the memory module 17, the invention proposes anticipating this readout not by using the last instruction read from the memory module 18 but by using one of the instructions which precedes it. In this way, when the last instruction in the memory module 18 is executed, the four instructions read simultaneously from the memory module 17 will be available and the microprocessor will be able to execute the first instruction I0 without inserting any non-operative cycle.

The implementation of this readout in anticipation is easy if the sequence of instructions in the two memory modules 17 and 18 comprises continuous addresses, that is to say addresses without jumps. For example, when the instruction at address X is being read from the memory module 18, a readout from the memory module 17 is carried out at the address (X+3).

In the case of a jump, the read address in the memory module 17 is not known at the time of anticipation and it is necessary to add this information to the instruction which controls the activation of the memory module 17 or to read this information from a table.

As has been mentioned above, the invention is applicable to data memories, but it is also applicable to the cache memories which were mentioned in the preamble to the present description.

In the case of an application to a cache memory which would be divided into two modules, the large capacity module would be a conventional cache memory with associative comparison of addresses whilst the low capacity module would be produced according to the invention for recording the instructions of the programs most often used, these instructions not being able to be recorded in the large capacity module. For this purpose, the programmer must record all of the instructions of a program corresponding to a certain portion of the address code in the low capacity module so that if an instruction comprises this portion of code, only the low capacity memory is read without associative comparison of addresses. Of course, if the low capacity module is a RAM type memory, it can be reloaded by another portion of code for the execution of another program, which necessitates a loading procedure controlled by the software.

In order to implement the computer system according to the invention, the following operations or steps must be carried out:

determination of the frequency of use by the microprocessor 11 of the programs of instructions or of data, recording of programs of instructions or of data the frequency of use of which is higher than a certain threshold S1 in a first memory module 18, M1 having short access time, recording of programs of instructions or of data the frequency of use of which is lower than the said threshold S1 in at least one other memory module 17, M2, M3 having a long access time, allocation, to each read address of the memory modules 17, 18, M1, M2, M3, of a code identifying the memory module which must be read at the indicated address, transmission by the microprocessor 11 to each memory module 17, 18, M1, M2, M3, of the read address and of the code identifying the memory module to be read, and transmission to the microprocessor 11 of the instruction or data read from the memory module identified by the code.

We claim:

1. In a computer system containing a microprocessor connected to a read only memory (ROM), the memory permanently storing instructions or data, and comprising:

a plurality of N independently connected ROM module means, of successively increasing capacity, for storing respective non-duplicated instructions or data, where N is equal to or greater than 2;

an access time to each memory module means increasing as a function of its capacity, the module means of smallest capacity being reserved for pre-programmed stored instructions or data that are determined in advance as most often used during the operation of the computer system;

the module means of largest capacity being reserved for the pre-programmed instructions or data that are determined in advance as the least often used during a functioning of the computer system;

a program counter included in the microprocessor for generating an address to address one of the module means to be read:

means connected between an output of the microprocessor and the module means for recording a code supplied by the microprocessor that indicates which module means is to be read;

wherein each instruction for access to the memory having N memory module means contains a code determining an identity of that one of the N memory module means from which the instruction or the data of a program must be read; and output means for transferring the instructions or data read from the module means to the microprocessor without transfer between module means.

2. A computer system according to claim 1, wherein the recording means is an n-bit register, where $2n \geq N$, and that is loaded by the microprocessor.

3. A computer system according to claim 2, together with an input circuit and an output circuit that are controlled by the code contained in the register, for reading a selected memory module determined by the code at the address indicated by the microprocessor and for transmitting the information read to the microprocessor.

4. A computer system according to claim 3, wherein the input circuit comprises decoding circuits for decoding the code recorded in the register and for selecting the memory module determined by the code.

5. A computer system according to claim 3, wherein the output circuit comprises at least one multiplexer circuit which is connected to read output terminals of the memory modules, and whose switching is controlled by the code contained in the register.

6. A computer system according to claims 1 wherein the memory module of smallest capacity has a read cycle equal to a basic cycle of the microprocessor while two remaining memory modules have read cycles that are respectively equal to two cycles and to four basic cycles of the microprocessor.

7. A computer system according to claim 6, wherein the recording means is a register loaded by the microprocessor, and further wherein a basic cycle of the microprocessor varies as a function of the code contained in the register for reading the memory of smallest capacity at a frequency F, and for reading the two remaining memory modules at frequencies F/2 and F/4, respectively.

8. A computer system according to claim 7 further comprising:

clock means for supplying clock signals at frequencies F, F/2, and F/4;

multiplexer means connected between an output of the clock means and an input of the microprocessor for selectively switching clock signals to the microprocessor;

and means connecting an output of the register to the multiplexer means for controlling a switching state of the multiplexer means as a function of the code stored in the register.

9. The computer system according to claim 1, wherein an instruction or data from the module of smallest capacity is read in the same time that several instructions or data are read in parallel from remaining memory modules.

10. The computer system according to claim 9, wherein the plurality of N ROM modules, of successively increasing capacity is equal to 2;

the system further comprising an output circuit that includes at least one buffer memory for the memory module of larger capacity for recording the instructions or data read in parallel from the module; and a multiplexer for switching the instructions or data contained in each buffer memory to the microprocessor.

11. The computer system according to claim 10, wherein the multiplexer associated with the memory module of larger capacity is controlled by signals representative of a code corresponding to the least significant bits (LSB) of the address of the memory module.

12. A method of implementing a computer system comprising the following steps of:

determining a frequency of use by a microprocessor of programs containing instructions or data;

pre-programming permanently stored instructions or data determined in advance, the frequency of program use being higher than a certain threshold, in a first random access memory (ROM) module having short access time;

pre-programming permanently stored instructions or data that are not duplicated in the first module and also determined in advance, the frequency of program use being lower than the threshold, in at least one other read only memory (ROM) module connected independently of the first ROM and having a long access time;

generating an address within the microprocessor for addressing one of the modules to be read;

allocating a code to each read address of the memory modules for identifying the memory module which must be read at an indicated address; and transmitting, to each memory module, the read address from a program counter within the microprocessor, identifying the location in a memory module to be read; and transmitting an instruction or data read from the memory module, identified by the code, to the microprocessor without transferral between modules.

* * * * *